United States Patent Office 3,063,877
Patented Nov. 13, 1962

3,063,877
METHOD AND SOLUTIONS FOR TREATING METAL SURFACES
Louis Schiffman, Elkins Park, Pa., assignor to Amchem Products, Inc., Ambler, Pa., a corporation of Delaware
No Drawing. Filed Oct. 10, 1960, Ser. No. 61,398
14 Claims. (Cl. 148—6.16)

This invention relates to the art of treating metal surfaces to enhance their corrosion resistant properties and paint bonding characteristics.

Steel, zinc, iron and aluminum surfaces which are intended for applications where they will be exposed to corrosive atmospheres or intended for applications where siccative coatings such as paint, enamel, japan or the like, are to be applied, are often treated with solutions which react with the surface to form what are known in the art as "conversion coatings." The patent literature is replete with processes and materials for the production of such conversion coatings and typical examples are found in U.S. Patents: 1,911,726; 2,121,574; 2,132,883; 2,293,716; 2,316,811; 2,326,309; 2,438,877; 2,472,864; 2,477,841; 2,479,423; 2,487,137; 2,494,910; 2,500,673; 2,591,479; 2,609,308; 2,657,156; 2,678,291; 2,702,768; 2,758,949; 2,762,731; 2,796,370; 2,796,371; 2,819,193; 2,851,385; 2,928,762; 2,936,254; and also in the copending application of Heller et al. Serial No. 721,340, filed March 14, 1958, now Patent No. 2,987,428, granted June 6, 1961.

Coatings produced by processes such as those disclosed in the patents mentioned above are quite useful, but it has been found that their qualities can be improved by a subsequent treatment or rinsing step. For example, after the application of a conversion coating to a surface, the surface is often rinsed with dilute solutions of chromic acid with or without other additives such as phosphoric acid. Even so, surfaces which have been subjected to such a two-step treatment are often less than completely satisfactory insofar as their corrosion resistance and paint bonding characteristics are concerned.

I have discovered a new process for the preparation and use of solutions, which solutions I have found to be very effective in the second of the treating steps discussed above, that is, in the rinsing of surfaces on which have been formed conversion coatings. In addition, I have discovered that the solutions prepared by my new process also are useful in treating metal surfaces which have not received a previously applied conversion coating.

It is an object of this invention to provide a method for preparing a treating solution for metal surfaces on which have been formed conversion coatings, which solution may be used to improve the corrosion resistant and paint bonding properties thereof.

It is another object of my invention to provide a method for preparing a treating solution for untreated metal surfaces which solution may be used to improve the corrosion resistant properties and paint bonding properties thereof.

A further object of this invention is the provision of new solutions for the treatment of metal surfaces, whether such surfaces have been subjected to a previous treatment or not.

Other objects and purposes of my invention, together with the above objects may be best understood by considering the detailed description which follows.

My invention is based on the discovery that improved treating solutions for metal surfaces are obtained when concentrated aqueous acid solutions of chromic acid are treated with formaldehyde to reduce a portion of the hexavalent chromium, and the solutions resulting from said treatment are diluted with water in amounts which will be discussed hereinbelow.

The concentrated aqueous chromic acid solutions employed in the invention preferably contain from about 50 to about 800 grams per liter of total chromium, expressed as $CrO_3$. It is also preferred that sufficient formaldehyde be reacted with the chromic acid to reduce at least 5 percent and preferably at least 20 percent of the total chromium present. It has been found that satisfactory corrosion protection is not obtained when less than about 5 percent of the total chromium present is reduced. The upper limit on the amount of total chromium present in reduced form is about 60 percent because both laboratory and plant experience has indicated that not over that amount (approximately) can be reduced under the operating conditions of this invention. This is true notwithstanding the addition of large excesses of formaldehyde and/or the use of elevated temperatures during or following the addition of the formaldehyde.

I have found it desirable to employ at least 0.03 mol of formaldehyde (calculated as HCHO) for each mol of hexavalent chromium (calculated as $CrO_3$) in order to reduce at least the minimum amount of chromium. For example, when a 33 percent $CrO_3$ solution is reacted with formaldehyde using the formaldehyde/chromic acid mol ratio of 0.03 to 1, there results a solution with about 5 percent of the chromium in reduced form. As an illustration of reaction ratios yielding a higher percentage of reduced chromium, I have found that by starting with the same 33 percent $CrO_3$ solution and reacting this solution with formaldehyde utilizing a formaldehyde/chromic acid mol ratio of 0.1 to 1, a solution containing about 20 percent of the chromium in reduced form is obtained. Thus, it can be seen that the use of a low formaldehyde/chromic acid ratio yields lower total reduced chromium. In addition, it has been found that decreasing concentration of the chromic acid solution results in lower reduced chromium values. Conversely, the amount of chromium obtained in the reduced state may be increased by utilizing more concentrated chromic acid or a higher formaldehyde chromic acid ratio.

In view of the limitations on the maximum amount of chromium which can be reduced by the method of this invention (discussed above), it is not necessary, in general, to use more than about 1 mole of formaldehyde for each mole of hexavalent chromium. If even higher mol ratios are used, the resulting product may tend to gel on standing. This gel causes no apparent harm and may be broken by vigorous stirring. However, the tendency toward gel formation may be substantially eliminated by the addition of small amounts of phosphoric acid either before or after the concentrate is diluted. As little as 0.05 milliliter of 75 percent $H_3PO_4$ solution per gram of total chromium (in both the hexavalent and reduced state) is sufficient to prevent such gelling.

All of the solutions discussed above have been found to be quite stable and may be produced in bulk form and stored in suitable containers until needed.

Since the reaction of formaldehyde with chromic acid is exothermic, it is, in general, preferred to add aqueous formaldehyde solution to the chromic acid because such a procedure permits close control of the temperature. However, other procedures for bringing together the formaldehyde and chromic acid for reaction purposes results in satisfactory solutions. For example, the reactants may be added simultaneously or chromic acid may be added to formaldehyde. The preferred procedure is to add the aqueous formaldehyde solution to the acid at such a rate that the temperature developed does not exceed about 180° F. This procedure minimizes the tendency for gel formation. Agitation has been found desirable during the formaldehyde addition step and following that step until the solution has cooled to room temperature.

Formaldehyde is available in a variety of forms, but the exact form does not appear to be important to the operation of the invention. That is to say, for the purposes of this invention monomeric or polymeric forms of formaldehyde, such as formalin solutions (about 36 percent HCHO) on the one hand, and paraformaldehyde (a linear polymer) on the other hand, have been found to be equivalent. However whatever form may be employed, it is important that at least 0.03 mol of formaldehyde (calculated as HCHO) be supplied for each mol of hexavalent chromium. The most practical source of formaldehyde from a commercial point of view is aqueous formalin solutions, which are readily available and easily handled.

The concentrate prepared by the process disclosed above is diluted with water for use in metal treating. The exact extent of the dilution depends on the application which is contemplated for the solution. It has been found that the determining factor for the dilution step is the concentration of total chromium (that is, hexavalent chromium plus reduced chromium) in the diluted solution. It will be understood, of course, that the proportion of reduced chromium to hexavalent chromium in the diluted solution is fixed by the formaldehyde treatment of the chromic acid prior to dilution and falls within the general limits discussed above. The general preferred concentrations of total chromium for various applications of the diluted solutions will be outlined below.

For solutions which are to be used as a final treatment or rinse solution over surfaces having crystalline zinc or manganese phosphate coatings, it is preferred that the concentration of the total chromium be between about 0.15 to about 2.0 grams per liter.

Iron, aluminum, or zinc surfaces (zinc including galvanized surfaces) are often treated with solutions which provide chromate-type conversion coatings. In addition, metal surfaces are often treated with the so called "non-coating" alkali metal phosphate solutions. Diluted solutions, which are used to provide a final treatment or rinse for surfaces coated with either of the above types of coating, should contain between about 0.15 to about 10 grams per liter of total chromium. Within this range it is preferred that the chromium concentration fall between about 0.15 to 2.0 grams per liter. I have discovered that the use of solutions containing less than about 0.15 gram per liter of total chromium does not impart sufficient corrosion protection to the metal, I have further noted that surfaces treated by such solutions are not as water repellant as desirable. When the treating solutions used for these applications contain more than about 10 grams per liter of total chromium, it has been found that a powdery or non-uniform film is often deposited on the surface. This powdery film impairs the paint bonding properties of the surface.

The concentrated solutions resulting from the formaldehyde treatment of the chromic acid may be diluted to provide useful solutions for treating clean bare metal surfaces, for example, iron, aluminum, and zinc (including galvanized) surfaces. For this application it has been found that the concentration of total chromium in the diluted solution should fall between about 0.15 to about 10 grams per liter. Treatment of clean surfaces with such solutions provides excellent corrosion protection.

The treating time for either class of applications of the diluted solutions prepared by my invention are very flexible. Whether the surface to be treated is either coated or bare metal, the length of treatment of the diluted solutions may vary from simple immersion for a few seconds as by dipping followed by immediate withdrawal to a period of as much as 5 minutes. For practical applications, the preferred treating time, however, falls within the range of about 15 seconds to about 2 minutes.

Similarly, the temperature at which the treatment is carried out is not critical and may vary from average room temperature (at about 70° F.) to about 150° F. It should be pointed out, however, that room temperature treatment is preferred inasmuch as this eliminates the necessity for providing and operating heating equipment.

The film resulting from treatment by the method of this invention should be dried immediately after the treatment. This may be accomplished by many methods well known in the art, for example, oven drying, forced air drying, exposure to infra-red lamps, etc.

In order to illustrate more concretely the invention and the advantages obtained thereby, there are presented below a number of examples. It is understood that these are offered merely by way of illustration and are not intended to be construed as a limitation of this invention.

EXAMPLE I

*Preparation of A Concentrate*

A solution containing 170 lbs. of $CrO_3$ dissolved in 40 gallons of water was prepared and labeled solution "A". Solution "B" was prepared by diluting 48 lbs. of commercial formalin (36.6 percent formaldhyde) with 21 gallons of water. Solution "B" was then added with stirring to solution "A," using a rate of addition which avoided the development of a reaction temperature higher than 180° F. After all of solution "B" had been added, the reaction mixture was stirred while sufficient water was then added to the reaction mixture to obtain 100 gallons of concentrated treating solution, which had a specific gravity of 1.15 (at 60° F., compared with water at the same temperature), a total chromium content of 104 grams per liter, and a hexavalent chromium content of 56 percent.

EXAMPLE II

*Treating Previously Coated Galvanized Steel*

Galvanized steel panels which had been coated in an 8 percent by volume coating solution of Formula I of U.S. Patent 2,121,574 were subjected to the action of a solution containing 0.5 gram per liter of total chromium, which solution was prepared by diluting a portion of the concentrated formulation of Example I above. The coated galvanized panels were treated in the diluted chromate solution at room temperature using a two-minute immersion cycle followed by a two-minute drying cycle at 400° F. Similarly coated galvanized panels were subjected to the rinsing action of a dilute chromic acid solution with a total chromium content of about 0.25 gram per liter in accordance with well known practice. All of these panels were then painted with a commercial alkyd base baking enamel and cured in a normal fashion. Subsequent salt-spray corrosion tests (using a standard 5 percent salt solution) run for a period of 336 hours are reported in Table I where both the treatments employed and the corrosion tests utilized are reported along with the test results.

EXAMPLE III

*Treating Coated Aluminum*

Aluminum panels which had been coated in the solution of Formula I of U.S. Patent 2,851,385 were subjected to a diluted treating solution of the present invention containing 0.7 gram per liter of total chromium, and prepared by diluting a portion of the concentrate from Example I. The immersion and drying cycles were as described under Example II. Additional aluminum panels were also coated in the solution of Formula I of the above identified patent but were not subjected to any final rinsing solution. All of these coated panels were then painted with a baking enamel and after curing were subjected to salt-spray corrosion tests. Results from these tests are summarized in Table I.

EXAMPLE IV

*Treating Coated Steel*

Steel panels which had been coated in accordance with Example I of U.S. Patent 2,316,811 (diluted to 2 percent by volume) were subjected to the action of a solution containing 0.15 gram per liter of total chromium, prepared by diluting a portion of the concentrated formulation of Example I above. Similarly coated steel panels were subjected to the rinsing action of a dilute chromic acid solution containing 0.25 gram per liter of total chromium. After drying, all of these panels were painted with a commercial baking enamel and then subjected to salt-spray corrosion tests. A summary of these results is reported in Table I.

EXAMPLE V

Treating Coated 24ST Aluminum Alloy

Aluminum alloy 24ST panels were subjected to the coating action of Formula I of U.S. Patent 2,438,877 and were subsequently treated in a diluted solution of Example I concentrate, which dilute solution contained 1.0 gram per liter of total chromium. A one-minute immersion cycle was employed at room temperature and the treated panels were then dried at 400° F. for two minutes. Results comparing the salt-spray corrosion resistance of these treated panels with similarly coated panels rinsed in chromic acid containing 0.25 gram per liter of total chromium are presented in Table I.

EXAMPLE VI

Preparation of A Concentrate

A solution, labeled "A," was prepared by dissolving 500 grams of $CrO_3$ in 1000 mls. of water. To this solution "A" was added at a slow rate with continuous agitation 205 grams of a commercial 36.9 percent formaldehyde solution. The maximum reaction temperature reached during the formaldehyde addition was 178° F. After all of the formaldehyde solution was added, the reaction mixture was diluted to 2300 mls. with water and 26 mls. of 75 percent $H_3PO_4$ were added to retard gel formation.

EXAMPLE VII

Treating Coated Steel

Steel panels which had been coated in the solution of 5 oz. per gallon of Formula I of U.S. Patent 2,479,423 were treated in a solution of Example VI which had been diluted to contain 0.25 gram per liter of total chromium. The treating cycle used was 90 seconds at room temperature followed by a two-minute drying cycle at 400° F. Additional steel panels, coated in the solution of Formula I of the above mentioned patent were rinsed in a dilute solution of chromic acid containing 0.25 gram of total chromium. All of these panels were then painted with an acrylic paint and baked in the normal fashion. Subsequent salt-spray corrosion tests on panels subjected to each of these final treatments and also on coated and painted but untreated specimens are summarized in Table I. In addition, results from a 48-hour exposure of these panels in a 2 percent Tide detergent solution (weight/volume using distilled water) which solution was maintained at 165° F. with constant agitation are included in Table I.

EXAMPLE VIII

Treating Coated Steel

Steel panels which had been coated in the solution of Example 8 of U.S. Patent 2,796,370 were treated with a dilute solution containing 0.7 gram per liter of total chromium resulting from the dilution of a portion of Example VI concentrate. A treating cycle of 30 seconds was employed followed by a two-minute drying cycle at 400° F. Additional steel panels, similarly coated, were subjected to the rinsing action of a dilute solution of chromic acid containing 0.25 gram per liter of total chromium. All of these finally treated panels were then painted with a baking enamel and subjected to salt-spray corrosion tests, the results of which are reported in Table I.

EXAMPLE IX

Treating Coated Zinc

Zinc panels which had been coated with a solution consisting of 0.52 percent Zn, 0.56 percent $NO_3$, 0.40 percent $ClO_3$, 0.0008 percent Cu and 0.068 percent $PO_4$, such as described in U.S. Patent 2,293,716 were subjected to the action of a solution containing 1.04 grams per liter of total chromium prepared by diluting a portion of Example I concentrate. A treating cycle of 15 seconds was followed by a three-minute drying period at 350° F. Additional zinc panels, similarly coated, were rinsed in a dilute solution of 0.25 gram per liter total chromium content, and all of these treated panels were then painted with a baking enamel and cured in a normal fashion. Subsequent salt-spray corrosion test results are reported in Table I.

EXAMPLE X

Treating Coated Galvanized Steel

An aqueous coating solution containing 8.0 percent ZnO, 27.6 percent $H_3PO_4$, 3 percent $NiCO_3$, 4.7 percent $HNO_3$, 0.7 percent HF and 0.56 percent $H_2TiF_6$ with the balance water, was diluted with water to 4 percent by volume and used to coat cleaned galvanized steel panels at a temperature of 150° F. for a two-minute immersion cycle. Groups of the treated and dried panels were then subjected to one of the following final treatments: (1) a dilute (0.25 gram per liter chromium content) solution of chromic acid; (2) a dilute solution of chromic (0.25 gram per liter chromium) and phosphoric (0.4 gram per liter $H_3PO_4$) acids; and (3) a portion of Example VI concentrate diluted to contain 5 grams per liter of total chromium. All of these panels, along with similarly coated but untreated panels were painted and then tested for corrosion resistance in both salt-spray and humidity tests. Results are summarized in Table I.

EXAMPLE XI

Treating Uncoated Aluminum

Clean aluminum panels were subjected to the action of a diluted solution containing 2 grams per liter of total chromium resulting from dilution of a portion of Example I concentrate. A two-minute treating cycle at room temperature followed by a two-minute drying cycle at 400° F. was employed. The dried panels were then coated with a commercial alkyd baking enamel and subsequently subjected to salt-spray corrosion tests along with similarly painted but untreated panels, and also with 0.25 gram per liter chromium content chromic acid rinsed and painted specimens. A summary of corrosion tests is contained in Table I.

EXAMPLE XII

Treating Uncoated Steel

Clean steel strips were treated for 90 seconds in a solution containing 10 grams per liter of total chromium obtained by diluting a portion of Example VI concentrate. The treated strips were dried with infra-red lamps and subsequently coated with a baking enamel. Subsequent corrosion tests compared these panels with 0.25 gram per liter chromium content chromic acid rinsed and painted panels are reported below in Table I.

EXAMPLE XIII

Treating Uncoated Galvanized Steel

Cleaned galvanized steel panels were treated in a solution containing 5 grams of total chromium per liter of solution resulting from the dilution of a portion of Example VI concentrate. A 45 second immersion cycle was employed and the treated panels were dried with infra-red lamps. Additional galvanized panels were rinsed in a dilute solution of chromic acid (0.25 gram per liter, total chromium) and all of these treated panels, along with cleaned but entirely untreated ones were painted with a commercial baking enamel and tested for corrosion protection in both humidity and salt-spray tests. Results from these tests are shown in Table I.

TABLE I

| Panels From Example | Final Treatment | Type | Corrosion Test Specifications | Results |
|---|---|---|---|---|
| II | 0.5 g./l. total Cr | Salt spray, 336 hrs | MIL-C-490A | Excellent. |
| II | Dilute CrO₃ (0.25 g./l. Cr) | do | MIL-C-490A | Fair. |
| III | 0.7 g./l. total Cr | Salt Spray, 168 hrs | MIL-C-5541 | Excellent. |
| III | None | do | MIL-C-5541 | Good. |
| IV | 0.15 g./l. total Cr | do | MIL-C-490A | Excellent. |
| IV | Dilute CrO₃ (0.25 g./l. Cr) | do | MIL-C-490A | Fair. |
| V | 1.0 g./l. total Cr | Salt Spray, 336 hrs | MIL-C-5541 | Excellent. |
| V | Dilute CrO₃ (0.25 g./l. Cr) | do | MIL-C-5541 | Fair. |
| VII | 0.25 g./l. total Cr | Salt Spray, 168 hrs | MIL-C-490A | Excellent. |
| VII | Dilute CrO₃ (0.25 g./l. Cr) | do | MIL-C-490A | Poor. |
| VII | None | do | MIL-C-490A | Very Poor. |
| VII | 0.25 g./l. total Cr | Tide Test, 2% @ 165° F., 48 hours. |  | Excellent. |
| VII | Dilute CrO₃ (0.25 g./l. Cr) |  |  | Very Poor. |
| VII | None |  |  | Do. |
| VIII | 0.7 g./l. total Cr | Salt Spray, 336 hrs | MIL-C-490A | Excellent. |
| VIII | Dilute CrO₃ (0.25 g./l. Cr) | do | MIL-C-490A | Good. |
| IX | 1.04 g./l. total Cr | Salt Spray, 168 hrs | MIL-C-17711 | Excellent. |
| IX | Dilute CrO₃ (0.25 g./l. Cr) | do | MIL-C-17711 | Fair. |
| X | None | do | MIL-C-490A | Very Poor. |
| X | Dilute CrO₃ (0.25 g./l. Cr) | do | MIL-C-490A | Fair. |
| X | Dilute CrO₃ (0.25 g./l. Cr)+H₃PO₄ | do | MIL-C-490A | Do. |
| X | 5 g./l. total Cr | do | MIL-C-490A | Excellent. |
| X | None | Humidity, 168 hrs | JAN H-792 | Poor. |
| X | Dilute CrO₃ (0.25 g./l. Cr) | do | JAN H-792 | Fair. |
| X | Dilute CrO₃ (0.25 g./l. Cr)+H₃PO₄ | do | JAN H-792 | Do. |
| X | 5 g./l. total Cr | do | JAN H-792 | Excellent. |
| XI | 2 g./l. total Cr | Salt Spray, 336 hrs | MIL-C-5541 | Excellent. |
| XI | Dilute CrO₃ (0.25 g./l. Cr) | do | MIL-C-5541 | Fair. |
| XI | None | do | MIL-C-5541 | Very Poor. |
| XII | 10 g./l. total Cr | Salt Spray, 168 hrs | MIL-C-490A | Excellent. |
| XII | Dilute CrO₃ (0.25 g./l. Cr) | do | MIL-C-490A | Very Poor. |
| XIII | 5 g./l. total Cr | do | MIL-C-490A | Excellent. |
| XIII | Dilute CrO₃ (0.25 g./l. Cr) | do | MIL-C-490A | Very Poor. |
| XIII | None | do | MIL-C-490A | Do. |
| XIII | 5 g./l. total Cr | Humidity, 168 hrs | JAN H-792 | Excellent. |
| XIII | Dilute CrO₃ (0.25 g./l. Cr) | do | JAN H-792 | Very Poor. |
| XIII | None | do | JAN H-792 | Do. |

The results set out in Table I make it apparent that my invention imparts appreciably improved corrosion protection to both coated metal surfaces and to clean but previously uncoated surfaces. These tests also indicate that the diluted solutions provided by my invention are highly suitable for protecting metal surfaces over a wide range of total chromium concentration.

I claim:

1. The method of making a treating solution for metal surfaces which comprises reacting an aqueous acid solution containing from about 50 to about 800 grams per liter of hexavalent chromium expressed as $CrO_3$ with from about 0.03 mol to about 1 mol of formaldehyde expressed as HCHO for every mol of hexavalent chromium whereby from about 5 percent to about 60 percent of the chromium is reduced and diluting the resulting solution with sufficient water to yield a solution containing from about 0.15 gram per liter to about 10 grams per liter of total chromium.

2. The method of making a metal treating solution concentrate which comprises reacting an aqueous acid solution containing from about 50 to about 800 grams per liter of hexavalent chromium expressed as $CrO_3$ with from about 0.03 mol to about 1 mol of formaldehyde expressed as HCHO for every mol of hexavalent chromium whereby from about 5 percent to about 60 percent of the chromium is reduced.

3. The method of claim 2 which comprises further adding to the solution a small amount of phosphoric acid to retard gel formation.

4. The method of making a treating solution for metal surfaces which comprises reacting an aqueous acid solution of hexavalent chromium with formaldehyde whereby a portion of the chromium is reduced, and diluting the resulting solution with water.

5. The method of improving chromate conversion coatings which comprises reacting an aqueous acid solution containing from about 50 to about 800 grams per liter of hexavalent chromium expressed as $CrO_3$ with formaldehyde whereby from about 5 percent to about 60 percent of the chromium is reduced, diluting the resulting solution with sufficient water to yield a solution containing from about 0.15 gram per liter to about 10 grams per liter of total chromium and rinsing the chromate conversion coating with said diluted solution.

6. The method of making a treating solution for metal surfaces which comprises reacting an aqueous acid solution containing from about 50 to about 800 grams per liter of hexavalent chromium expressed as $CrO_3$ with formaldehyde whereby from about 5 percent to about 60 percent of the chromium is reduced and diluting the resulting solution with sufficient water to yield a solution containing from about 0.15 gram per liter to about 10 grams per liter of total chromium.

7. The method of improving alkali metal phosphate coatings which comprises reacting an aqueous acid solution containing from about 50 to about 800 grams per liter of hexavalent chromium expressed as $CrO_3$ with formaldehyde whereby from about 5 percent to about 60 percent of the chromium is reduced, diluting the resulting solution with sufficient water to yield a solution containing from about 0.15 gram per liter to about 10 grams per liter of total chromium and rinsing said coating with said diluted solution.

8. The method of improving crystalline zinc or manganese phosphate coatings which comprises reacting an aqueous acid solution containing from about 50 to about 800 grams per liter of hexavalent chromium expressed as $CrO_3$ with formaldehyde whereby from about 5 percent to about 60 percent of the chromium is reduced, diluting the resulting solution with sufficient water to yield a solution containing from about 0.15 gram per liter to about 2.0 grams per liter of total chromium and rinsing said coating with said diluted solution.

9. The method of improving conversion coatings which comprises reacting an aqueous acid solution containing from about 50 to about 800 grams per liter of hexavalent chromium expressed as $CrO_3$ with formaldehyde whereby from about 5 percent to about 60 percent of the chromium is reduced, diluting the resulting solution with sufficient water to yield a solution containing from about 0.15 gram per liter to about 2.0 grams per liter of total chromium, and rinsing said coating with said diluted solution.

10. The method of improving the corrosion resistant and paint bonding properties of metal surfaces from the class consisting of clean uncoated metal surfaces and metal surfaces with previously applied conversion coatings thereon, which method comprises reacting an aqueous acid solution of hexavalent chromium with formaldehyde whereby a portion of the chromium is reduced, diluting the resulting solution with water, and rinsing said surfaces with said diluted solution.

11. The method of applying protective coatings to metal surfaces selected from the class consisting of aluminum, aluminum alloys, iron, steel, zinc and galvanized metals which method comprises reacting an aqueous acid solution containing from about 50 to about 800 grams per liter of hexavalent chromium expressed as $CrO_3$ with formaldehyde whereby from about 5 percent to about 60 percent of the chromium is reduced, diluting the resulting solution with sufficient water to yield a solution containing from about 0.15 gram per liter to about 10 grams per liter of total chromium, and applying said diluted solution to the metal surface.

12. A concentrate for use in preparing metal treating solutions consisting essentially of the reaction products resulting from admixture of an aqueous acid solution consisting essentially of from about 50 to about 800 grams per liter of hexavalent chromium expressed as $CrO_3$ with from about .03 mol to about 1 mol of formaldehyde expressed as HCHO for every mol of hexavalent chromium.

13. A solution for treating metal surfaces consisting essentially of the reaction products resulting from admixture of an aqueous acid solution consisting essentially of from about 50 to about 800 grams per liter of hexavalent chromium expressed as $CrO_3$ with from about .03 mol to about 1 mol of formaldehyde expressed as HCHO for every mol of hexavalent chromium, and dilution of the resulting solution with sufficient water to yield a solution containing from about 0.15 gram per liter to about 10 grams per liter of total chromium.

14. An aqueous metal treating solution consisting essentially of from about 0.15 gram per liter to about 10 grams per liter of total chromium, wherein from about 40 percent to about 95 percent of the chromium is in the hexavalent state and the remainder is reduced chromium.

References Cited in the file of this patent

UNITED STATES PATENTS

| | | |
|---|---|---|
| 2,488,651 | Whiting et al. | Nov. 22, 1949 |
| 2,768,104 | Schuster et al. | Oct. 23, 1956 |
| 2,773,623 | Schuster et al. | Dec. 11, 1956 |